LOUDSPEAKER TELEPHONE CIRCUIT ARRANGEMENT

Filed Nov. 15, 1968 7 Sheets-Sheet 1

*Inventor*

A.H.P. BAKER

By D.G. Warner

*Attorney*

LOUDSPEAKER TELEPHONE CIRCUIT ARRANGEMENT

Feb. 9, 1971 A. H. P. BAKER 3,562,791

LOUDSPEAKER TELEPHONE CIRCUIT ARRANGEMENT

Filed Nov. 15, 1968 7 Sheets-Sheet 4

Feb. 9, 1971 A. H. P. BAKER 3,562,791

LOUDSPEAKER TELEPHONE CIRCUIT ARRANGEMENT

Filed Nov. 15, 1968 7 Sheets-Sheet 7

3,562,791

LOUDSPEAKER TELEPHONE CIRCUIT ARRANGEMENT

Arthur Herbert Patrick Baker, Sevenoaks, England, assignor to International Standard Electric Corporation, New York, N.Y., a corporation of Delaware Filed Nov. 15, 1968, Ser. No. 776,136
Claims priority, application Great Britain, Dec. 7, 1967, 55,738/67, 55,739/67, 55,740/67, 55,741/67
Int. Cl. H04m *1/60*
U.S. Cl. 179—1 6 Claims

ABSTRACT OF THE DISCLOSURE

A loudspeaker telephone circuit arrangement providing a hybrid circuit coupled to a telephone line, a microphone transmission channel and a loudspeaker reception channel coupled to an input and an output of the hybrid circuit respectively, a control circuit coupled to the microphone channel and the loudspeaker channel for controlling the transmission to and reception from said telephone line respectively, a microphone switching amplifier and a loudspeaker switching amplifier coupled between the control circuit and the microphone channel and between the control circuit and the loudspeaker channel respectively for biasing the control circuit in opposite directions, an echo detector coupled between the loudspeaker channel and the microphone switching amplifier to prevent loudspeaker signals from being transmitted out on the telephone line, and a breakthrough muting circuit coupled between the hybrid circuit and the loudspeaker switching amplifier to prevent "breakthrough" of signals from said microphone channel to the loudspeaker channel via the hybrid circuit.

The invention relates to loudspeaking telephone circuits.

One of the problems with loud-speaking telephone arrangements in which incoming signals are amplified to a loudspeaker while outgoing speech is fed from a microphone, amplified, and transmitted to the telephone line, is the problem of reverberation or echo in the room in which the apparatus is installed. To avoid singing around the loop formed by the microphone channel, the telephone line hybrid circuit and the loudspeaker channel by acoustic coupling between the loudspeaker and the microphone, it is common practice to arrange voice-operated control circuits to depress the gain of one channel and enhance the gain in the other channel in accordance with the particular channel in which speech signals appear. During quiescent periods, when there is no speech from either the local or the distant talker, it is usual, however, to leave the circuits so that the loudspeaker channel remains operative for incoming signals while the microphone channel is muted or, alternatively, to arrange that the apparatus is left with that channel operative which was last switched up by the control circuits, the other channel remaining muted. In either case it can happen that, during a break in the distant talker's conversation, room echo causes speech signals, which are recognized as such, to enter the microphone channel and so cause the channels to be switched round with the microphone channel now at high gain and the loudspeaker channel muted. Not only can this cause clipping of the distance speaker's next syllables, due to the inevitable time lag, however short, before the local channels are switched back again to their former condition, but, if the distant talker is also using loud-speaking telephone apparatus in a reverberant room, a regenerative condition may be set up between the local and distant circuits. Thus, an echo in the local room can cause the local microphone channel to be switched up and the echo signals to be transmitted to line and, at the distant circuit, to cause the apparatus there to be switched from microphone channel to loudspeaker channel; the echo from the local room now appears in the distant room and generates a further echo; this further echo in the distant room causes the distant channels to be switched back again and transmit re-echo back to the local room. Thus, a signal re-echoes back and forth continuously between local and distant rooms. This echo loop-regeneration effect can be particularly troublesome where automatic gain control is applied to each of the loudspeaker channels, for then, during pauses longer than the usual interval between words or syllables, the gain control means will tend to increase the gain of the operative loudspeaker channel so that the echo signals, which of their nature are delayed, will be enhanced at the loudspeaker.

In accordance with one aspect of the present invention there is provided a loud-speaking telephone circuit including a microphone channel, a loudspeaker channel, a signal amplifier in each channel, respective switching amplifiers associated with each channel, control means responsive to the difference in outputs of the switching amplifiers of the two channels, means to increase the gain of the signal amplifier in the channel whose switching amplifier has the greater output and to reduce the gain of the signal amplifier in the other channel, means for reducing the gain of the switching amplifier associated with the microphone channel in accordance with the output of the loudspeaker channel and automatic gain control means responsive to the output of the loudspeaker channel and operative to control the level of the input to the loudspeaker signal amplifiers, the input to the associated switching amplifier means being fed from the input to the signal amplifier.

Another problem with loud-speaking telephone arrangements arises from the unavoidable acoustic link between the loudspeaker and microphone. This necessitates measures involving the muting of the microphone channel when the loudspeaker channel is in operation and vice versa. This reciprocal muting is achieved by voice-operated switching circuits, in the design of which several factors have to be taken into account. To avoid clipping of the commencement of speech signals, the switching arrangements must be fast to operate but must not fall out or switch over during the intersyllabic pauses characteristic of speech. Furthermore, and this is linked with a problem of avoiding singing due to the acoustic link between local loudspeaker and microphone, when once switching has occurred to make, say, the microphone channel active and to mute the loudspeaker channel, it is necessary to provide a margin between the level at which the signals in the loudspeaker channel can now change over the switching to enable the distant talker to break in. This is usually called "hysteresis." Hysteresis is also introduced to provide a margin against electrical break-through due to lack of isolation between the microphone and loudspeaker channels and their associated voice-operated switches. If there is too much hysteresis, it will not be possible, when one subscriber stops talking, for the other to seize the circuit without excessive rise of level in his speech or shouting.

A loud-speaking telephone system normally incorporates a hybrid circuit to provide electrical isolation between loudspeaker channel and microphone channel while coupling each of these channels to the telephone line. Because, in particular, of the wide variations in impedance of a telephone line under different circumstances, such as the length of line involved, hybrid balance is never so good as is theoretically possible for invariant circuits joined by a hybrid network. Due to hybrid unbalance, when a local subscriber is using his microphone, there will inevitably be some breakthrough into the local loudspeaker channel from the microphone channel across the hybrid circuit. If the level at the output of the microphone channel is too high, unless a normally excessive amount of hysteresis is employed in the system, it thus becomes possible for the breakthrough signal in the loudspeaker channel to seize the voice-operated switching equipment and mute the microphone channel. Thus, it could happen that the louder the local subscriber shouts the less effective he is in getting through to the distant subscriber, because his shouting has muted his own circuit.

According to an aspect of the present invention there is provided a loud-speaking telephone circuit including a microphone channel, a loudspeaker channel, a signal amplifier in each channel, respective switching amplifier means associated with each channel, control means responsive to the difference in outputs of the switching amplifier means, means to increase the gain of the signal amplifier in the channel whose switching amplifier means has the greater output and to reduce the gain in the signal amplifier of the other channel, a hybrid circuit coupling the two channels to a common telephone line and means responsive to signals of more than a given level at the junction between the microphone channel and the hybrid circuit for reducing the gain of the switching amplifier associated with the loudspeaker channel.

Automatic gain control is frequently provided in signal amplifiers with the object of maintaining the output level of the amplifier substantially constant irrespective of the level, above a certain minimum, of the input signals. One of the problems which arises with an audio frequency amplifier having automatic gain control is that known as A.G.C. bursting. The expression "A.G.C. bursting" is used to name the following phenomenon:

When an A.G.C. amplifier is in the quiescent state, that is in the absence of an input signal, the gain is at a maximum; when an input signal above the minimum level for actuation of the automatic gain control is received, a finite time is needed before the A.G.C. becomes effective; during this interval the input signal receives full amplification so that there is an initial peak to the curve relating output level with time—in other words there is an initial burst of output at a higher level than the A.G.C. arrangement is designed to provide. A.G.C. bursting is particularly objectionable if the amplifier feeds a loudspeaker in a speech communication system.

A.G.C. bursting can also occur and be objectionable in signal generating apparatus arranged to supply discontinuous signals to an output load. Signal generating apparatus includes, essentially, an oscillator. Fundamentally, an oscillator is an amplifier having a frequency selective feedback loop and some form of gain control such that, at the frequency of oscillation, the loop gain is unity. Although many oscillators rely on the inherent non-linearity of the amplifier to limit the loop gain, it is also quite common to provide separate gain limiting means. In such cases the gain-controlling means may well have a time constant such that, after switching on, instead of oscillations building up to the level determined by the automatic gain control means, they build up more rapidly until limited by non-linearity in the amplifier before the automatic gain controlling means becomes effective. In this case, when the oscillator is switched on, automatic gain control bursting will occur and, for some applications, where the oscillator is required to be switched on and off intermittently, A.G.C. bursting may prove troublesome.

According to the present invention there is provided signal amplifying or generating apparatus including automatic gain control means for feeding the signals to a load at a predetermined output level whereas, in the absence of the control means, the output level would depend on the magnitude of the load, the apparatus also including a rectifier-capacitor combination shunted across the output connections for the load, the charging time constant of and the damping provided by the combination being such as to offset automatic gain control bursting.

Although the invention is applicable to signal amplifying or generating apparatus as defined above and which would otherwise be liable to undesirable A.G.C. bursting, the invention is particularly applicable to audio frequency amplifiers which use a combination of a lamp and a photosensitive resistor for A.G.C. purposes.

As applied to such an amplifier the invention provides an audio frequency amplifier including automatic gain control means providing reduction of overall gain with increase of light flux received by a photosensitive resistor, a lamp energized by the amplifier output signal and arranged to illuminate the photosensitive resistor, and a rectifier-capacitor combination shunting the amplifier output, the charging time and damping of the rectifier-capacitor combination being chosen to offset automatic gain control bursting.

Embodiments of various aspects of the invention will be described with reference to the accompanying drawings in which.

Figure 1:
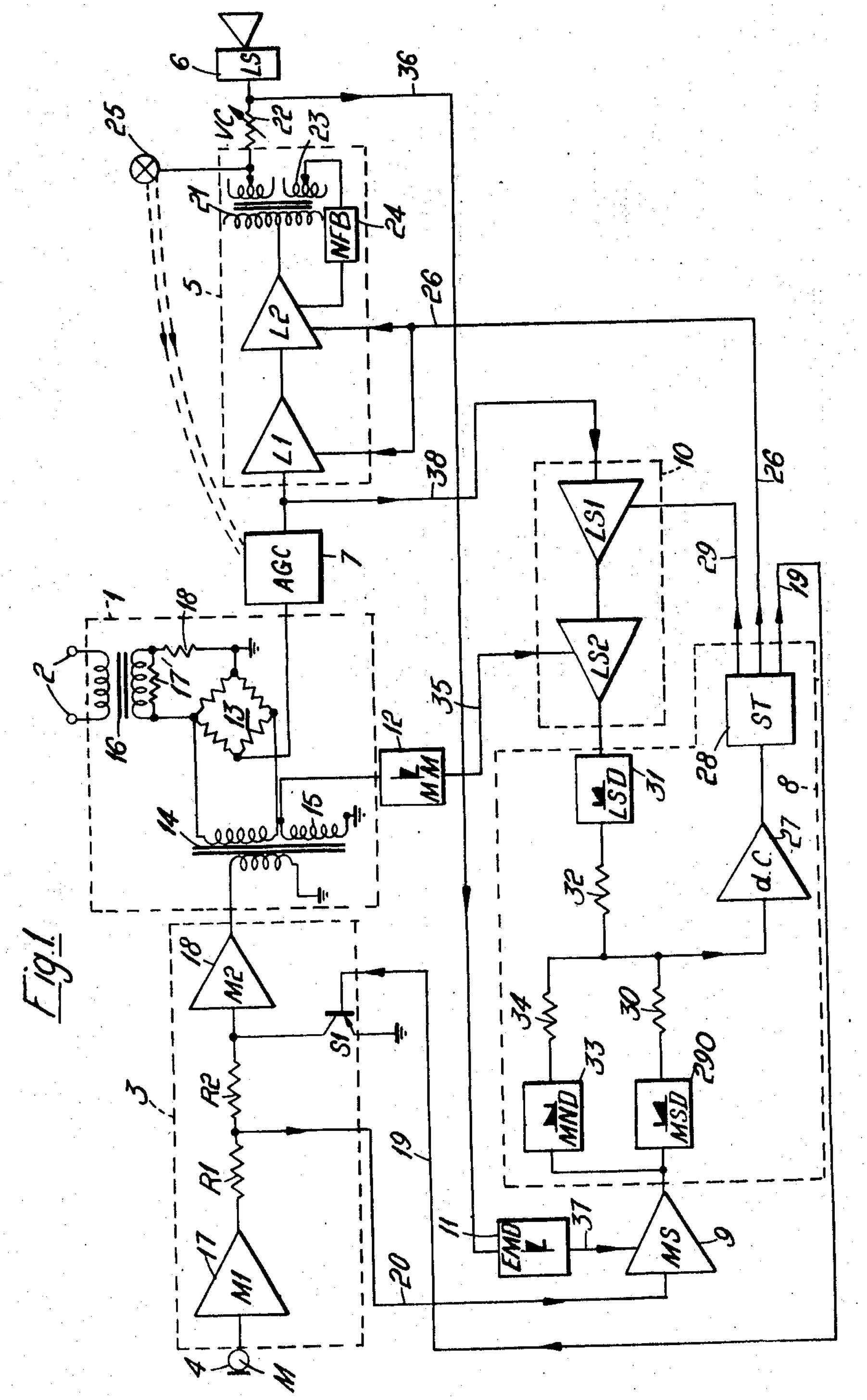
FIG. 1 is a block circuit diagram of a loud-speaking telephone circuit according to the invention.

The block diagram of FIG. 1 illustrates the speech-operated parts of loud-speaking telephone apparatus installed at one end of a telephone line, the ancillary dialling and ringing equipment, and also a local power supply, being omitted from the drawing. The arrangement shown can conveniently be separated into the following portions: a hybrid circuit 1 affording connection to a telephone line connected at terminals 2, a microphone channel 3 fed from a microphone 4, a loudspeaker channel amplifier 5 feeding a loudspeaker 6 and fed from the hybrid circuit 1 through an automatic gain control attenuation circuit 7, a speech operated control circuit 8 for muting the microphone channel or the loudspeaker channel as required, a switching amplifier 9 labelled MS feeding signals from the microphone channel to the control circuit 8, a switching amplifier 10 for feeding signals from the loudspeaker channel to the switching circuit, an echo-muting circuit 11, labelled EMD, arranged to control the gain of the microphone channel switching amplifier 9 in accordance with the loudspeaker output, and a hybrid-breakthrough muting circuit 12, labelled MM, controlling the gain of the switching circuit associated with the loudspeaker channel in accordance with the microphone input to the hybrid circuit. In accordance with the usual convention, connections between various units of the circuit of FIG. 1 carrying control signals are labelled with arrows directed towards the units which are so controlled.

The hybrid circuit 1 includes a resistive bridge 13 one of whose terminals is grounded. The diagonally opposite bridge terminal is connected to the unbalanced A.G.C. circuit 7 and loudspeaker channel amplifier 5. The conjugate pair of terminals is connected across a secondary winding of a microphone channel transformer 14 which feeds the hybrid circuit with signals from the microphone channel. A tertiary winding 15 on transformer 14 feeds the hybrid breakthrough muting circuit MM, which is unbalanced. A line transformer 16 has one winding connected across the telephone line terminals 2. Its other winding is shunted by resistor 17′ and is connected at one end through building-out resistor 18 between the grounded or earthed terminal of bridge 13 and at its other end to one of the adjacent bridge terminals.

The microphone channel includes a pair of unbalanced amplifiers 17 and 18, labelled M1 and M2, interconnected by a microphone channel attenuating circuit formed by a series arm provided by a pair of series resistors R1 and R2 and a shunt arm provided by the collector-emitter circuit of a switching transistor S1 connected across the input of amplifier M2. The transistor S1 is switched by control potentials applied to its base electrode through lead 19 from the control circuit 8. Lead 20 from the junction between resistors R1 and R2 provides an input for the microphone channel switching amplifier 9.

The loudspeaker channel amplifier 5 has an input stage represented in FIG. 1 as amplifier L1 and further stages shown as a further amplifier L2. L2 feeds loudspeaker 6 through an output transformer 21 and manual volume control 22 labelled VC. Negative feedback for L2 is provided by a feedback winding 23 and a feedback network 24, labelled NFB, which is effective to stabilize the gain of L2 and reduce its output impedance.

A low power lamp 25 is tapped across the output winding of transformer 21 and is arranged to illuminate a photosensitive resistor in the A.G.C. circuit 7. Change in resistance of the photosensitive resistor with its illumination is arranged to vary attenuation of input signals to the loudspeaker channel amplifier 5. A detailed description of the A.G.C. circuit is given below in connection with the description of FIG. 3. The gain of amplifiers L1 and L2 may be reduced so as to mute the loudspeaker channel by control voltages applied to L1 and L2 simultaneously from the control network 8 via lead 26. The potential on lead 26 opens or closes a switching transistor arrangement, similar to the transistor switch S1, whereby a large amount of local negative feedback is applied to or removed from amplifiers L1 and L2.

The control circuit 8 is based upon a D.C. amplifier 27 and a bistable switch circuit 28 labelled ST. The bistable circuit ST provides three outputs over leads 19, 26 and 29 respectively. As already explained, the potential of leads 19 and 26 controls the microphone channel muting switch S1 and the gain of the loudspeaker channel amplifiers L1 and L2. The potential of lead 29 controls the gain of section LS1 of loudspeaker channel switching amplifier 10.

The control circuit 8 receives a signal input from the microphone channel switching amplifier 9 and the loudspeaker channel switching amplifier 10. Speech signals at the output of the microphone channel switching amplifier are recognized and detected by the microphone speech detector 290, labelled MSD, and the resulting direct current proportional to the signals is fed through resistor 30 to the input of D.C. amplifier 27. Speech signals at the output of the loudspeaker channel switching amplifier 10 are similarly fed to a loudspeaker channel speech detector 31, labelled LSD, and the resulting D.C. output is fed, in opposition to that from the microphone channel speech detector, to the input of D.C. amplifier 27.

It is to be noted that the input to the loudspeaker channel switching amplifier 10 is taken over lead 38 from the input to the loudspeaker channel signal amplifier 5 where the input level is controlled by the A.G.C. circuit 7. Because of this the operation of the control circuit 8 in response to incoming speech is largely independent of whether the distant talker is talking loudly or softly. This arrangement forms the subject matter of FIG. 3 which is described in detail below.

The detectors 290 and 31 are basically similar and follow known speech detector technique in that they incorporate full-wave rectification with short charging time constant and long discharge time constant, so being fast to operate on the sharply rising transients of normal speech and provide "hand-over" during intersyllabic intervals. They do not, as such, discriminate against background noise or signals not due to speech, but, since most traffic noise and the like has fundamental frequencies below that of the normal male human voice, a large amount of such background noise is removed in the amplifiers themselves, which are arranged to cut off at these low frequencies. Furthermore the predominant source of noise in a loudspeaking telephone system is acoustic noise transmitted through the microphone. Such noise will be relatively continuous, as compared with speech, and therefore may be distinguished. For this purpose the output of the microphone switching amplifier 9 also feeds a microphone noise detector circuit 33, labelled MND, which is sensitive only to continuous A.C. and is arranged to provide a D.C. output to the amplifier 27 over resistor 34 in opposition to the control signal fed from detector 290. Thus continuous noise at the microphone will not result in seizure of the switch circuit 8 by the microphone channel in the absence of speech-like signals in that channel. The gain reduction in LS1 effected by ST switching over from loudspeaker to microphone channel is not sufficient to prevent signals arriving at the input of the loudspeaker channel amplifier 5 from passing through to the amplifier stage LS2 and thence, in the absence of very loud speech currents in the microphone channel, from being detected and becoming operative on D.C. amplifier 27. The main purpose of the switched amplifying stage LS1 is to provide sufficient gain in the switching amplifier to hold the loudspeaker channel operative when once it has been seized; the switched gain provides "hysteresis," as it is called—a margin between the speech levels at which the control circuit 8 switches over.

Perfect balance in the hybrid circuit 1 is unobtainable. There will therefore inevitably be some leakage of signals from the microphone channel through the hybrid circuit to the loudspeaker channel. Normally these leakage signals will be sufficiently attenuated by the hybrid balance to be of no effect. In some circumstances, however, if the local talker shouts into the microphone 4, sufficient signal may pass through to the loudspeaker channel to cause the system to switch over, so that the effect of shouting at the microphone will be, not to seize the microphone channel, but to mute it against the local talker. This is prevented by the hybrid breakthrough guard circuit provided by the tertiary winding 15 on the microphone channel transformer 14 and the muting circuit 12. The muting circuit 12 has a speech detector which is relatively insensitive, but when it detects a loud speech signal it applies potential over line 35 to the switching amplifier stage LS2 and reduces the gain of the loudspeaker channel switching amplifier. The feature of this provision against hybrid breakthrough forms the subject matter of FIG. 4 which is discussed below.

In spite of the provision of automatic volume control over the loudspeaker channel, which will be effective in evening out the difference in volume between loud and soft talking at the distant end of the telephone line, it is desirable to control the loudspeaker volume manually to suit personal preferences and the actual conditions of room acoustics and noise at the place where the loudspeaking telephone apparatus is installed. For this purpose the manual volume control 22 is provided at the loudspeaker itself and outside the A.G.C. path.

If the manual volume control setting is too high, or there are pronounced room echoes, breakthrough, analogous to the hybrid breakthrough discussed above, but this time through the acoustic path between loudspeaker and microphone, may occur, causing the microphone channel to seize control, at least momentarily. To prevent this, the echo muting detector 11 has its input fed from the loudspeaker terminals over lead 36 and, if the level at the loudspeaker terminals is sufficiently high, EMD will apply a control potential over its output lead 37 to reduce the gain of the microphone switching amplifier 9. The echo-muting circuit has a fast charge, slow discharge characteristic which is effective against room echoes.

The input impedance of the echo-muting detector circuit 11, as presented to the output of the loudspeaker channel signal amplifier 5, provides initial damping of that output when the loudspeaker channel is in a quiescent condition with the A.G.C. circuit allowing full gain. This damping is rapidly removed due to the charging up of the detector circuit when signals appear in the loudspeaker channel, but is of sufficient duration to offset the time lag of the photosensitive resistor in A.G.C. circuit 7 which would otherwise permit A.G.C. bursting—that is an initial burst after a quiescent period before the A.G.C. circuit has time to take control and reduce the overall signal channel gain. This subject matter is discussed further in connection with FIG. 5 through FIG. 9.

The normal sequence of operation of the loud-speaking telephone arrangement of FIG. 1 will now be briefly described. Let it be assumed that the bistable switch circuit 28 is left in a condition in which the loudspeaker channel is open and the microphone signal channel muted.

A signal at the microphone is amplified by M1 and the microphone switching amplifier 9, the output of which is rectified by detector 290 and, provided the output through resistor 30 is greater than that through resistors 32 and 34 from the loudspeaker channel and the microphone noise detector respectively, the D.C. amplifier 27 will change the condition of switch circuit 28. The loudspeaker channel signal amplifier 5 will now become muted and the gain of its switching amplifier 10 reduced, while transistor switch S1 will open, removing the attenuation from the microphone channel and permitting the microphone signals to pass through to the hybrid circuit 1 and thence out to line. Opening of the switch S1 also increases the speech level applied to the microphone switching amplifier 9 and hence ensures that the switching circuit 28 is held by the microphone channel with ample margin.

If now a line signal arrives. it will be amplified by loudspeaker channel switching amplifier 10 (at reduced gain) and if sufficiently strong will cause switch circuit 28 to switch over, mute the mircophone signal amplifier, open the loudspeaker channel signal amplifier 5 and increase the gain of loudspeaker channel switching amplifier 10. With the feeding of power to the loudspeaker, the detector 11 will reduce the gain of the microphone channel switching amplifier 9 and the circuit will be held by the incoming signals. On the other hand, if the local talker breaks in sufficiently loudly, the detector circuit 12 will come into play and decrease the gain of loudspeaker switching amplifier LS2 enabling the local talker to take control again. Otherwise, with normal conversation, the switching circuit will tend to remain held until the opposite talker speaks during a pause in the conversation. As explained previously, the effect of room echo is offset by the detector 11 and hybrid breakthrough by the detector 12, A.G.C. bursting at the loudspeaker is offset by the damping effect of circuit 11, while the automatic gain control circuit 7 equalizes the effect on the switching of the apparatus of different levels of distant talker.

Figure 2:
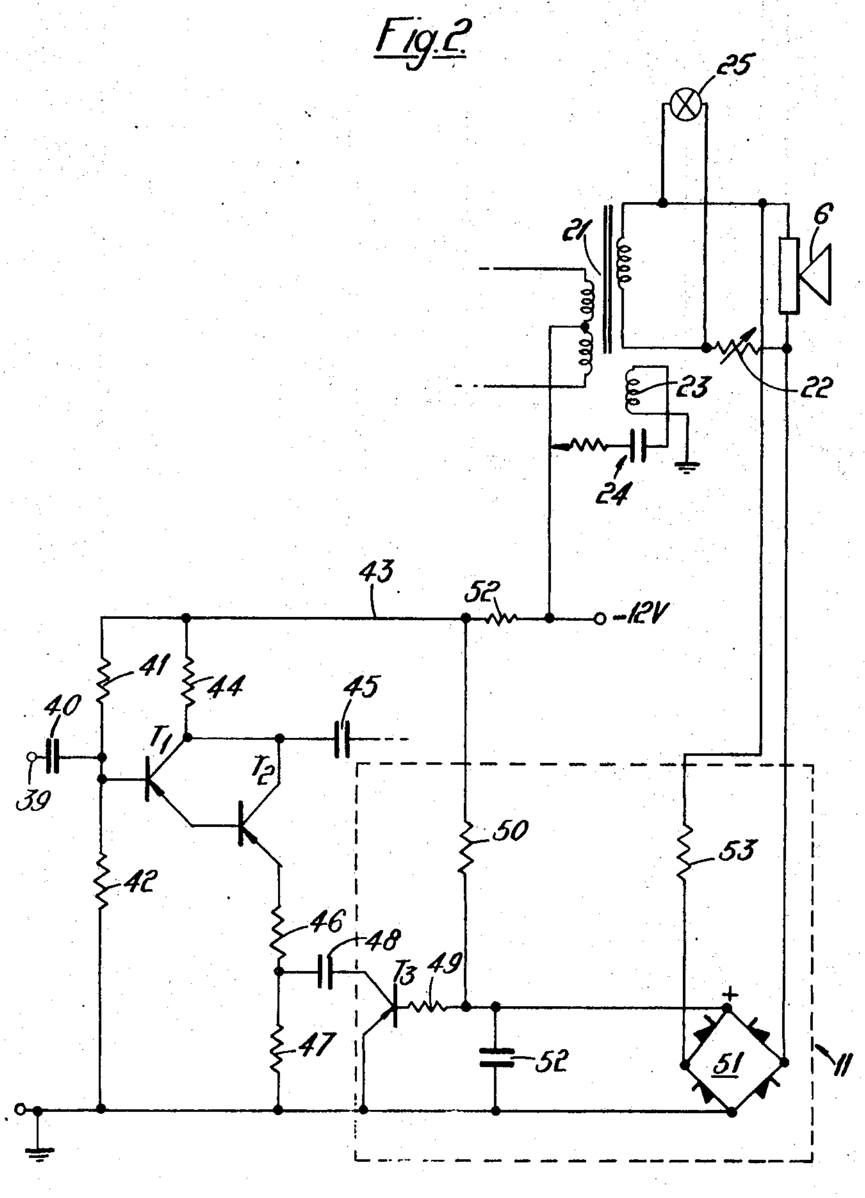
FIG. 2 is a schematic diagram of the relevant parts of the microphone channel switching amplifier.

Referring now to FIG. 2, the arrangement of the echo muting detector 11 and its associated circuitry will now be described in fuller detail. The circuit components appropriate to the detector circuit 11 are enclosed in FIG. 2 by the dotted rectangle. To the left of this rectangle there is shown details of the input circuit of the microphone channel switching amplifier 9 and, above the rectangle, the output portion of the loudspeaker channel signal amplifier 5 and the loudspeaker 6.

The input terminal of the microphone switching amplifier is indicated at 39 and is connected to the base electrode of transistor T1 through D.C. blocking capacitor 40. The other input terminal is earthed. The base electrode of T1 is held at a constant D.C. potential by being also connected to the junction of resistors 41 and 42 which are connected in series between negative power supply line 43 and earth. The collector of T1 receives power from supply line 43 through resistor 44. The emitter of transistor T1 is connected to the base of transistor T2 in a Darlington pair arrangement. The collectors of T1 and T2 feed the subsequent stages (not shown) of the amplifier through capacitor 45. The emitter of transistor T2 is connected to earth through resistors 46 and 47, the resistor 47 being normally bypassed for speech currents by capacitor 48 which has one terminal connected to the junction of resistors 46 and 47 and the other connected to earth through the emitter-collector circuit of transistor T3. The emitter of transistor T3 is connected directly to earth. The base of T3 is connected through resistor 49 to the positive D.C. terminal of rectifier bridge 51 the negative D.C. terminal of which is earthed. The junction of rectifier bridge 51 and resistor 49 is connected to negative supply line 43 through resistor 50. The rectifier bridge D.C. terminals are shunted by a capacitor 52. The negative supply line 43 is taken to a terminal labelled −12L through resistor 52. The A.C. terminals of rectifier bridge 51 are connected through resistor 53 to the terminals of loudspeaker 6. Loudspeaker 6 is fed from the secondary winding of transformer 21 through manual volume control 22 with A.G.C. lamp 25 connected across the secondary winding, while a tertiary winding 23 provides negative feedback for the loudspeaker amplifier through feedback network 24, all as previously described. The primary of transformer 21 is fed from the output transistors of the loudspeaker channel signal amplifier 5 of FIG. 1 and its center tap is connected to the −12 v. supply terminal.

The operation of the arrangement of FIG. 2 is as follows. With no power fed to the loudspeaker the base of transistor T3 is held slightly negative and capacitor 48 is returned to earth through the low impedance emitter-collector path of the transistor. Resistor 47 is therefore bypassed for speech frequency currents. When power is supplied to the loudspeaker, capacitor 52 will charge up rapidly, the base potential of T3 will rise and the earth connection to capacitor 48 will be virtually removed. Resistor 47 is no longer bypassed and therefore applies considerable negative feedback to the input stage of the switching amplifier, whose gain is thus reduced. The discharge time of the capacitor 52 is determined primarily by the value of its capacitance and the size of resistor 50 and hence may be made long. The time during which the gain reduction of the microphone switching amplifier persists is dependent upon the voltage to which capacitor 52 is charged, that is, it is dependent on the level at the loudspeaker terminals.

In a typical embodiment of the invention capacitor 52 was 10 $\mu$f. and resistor 50 56K ohms. Resistors 46 and 47 were respectively 680 ohms and 1.8K ohms, while capacitor 10 was 10 $\mu$f. and resistor 49 33K ohms.

Figure 3:
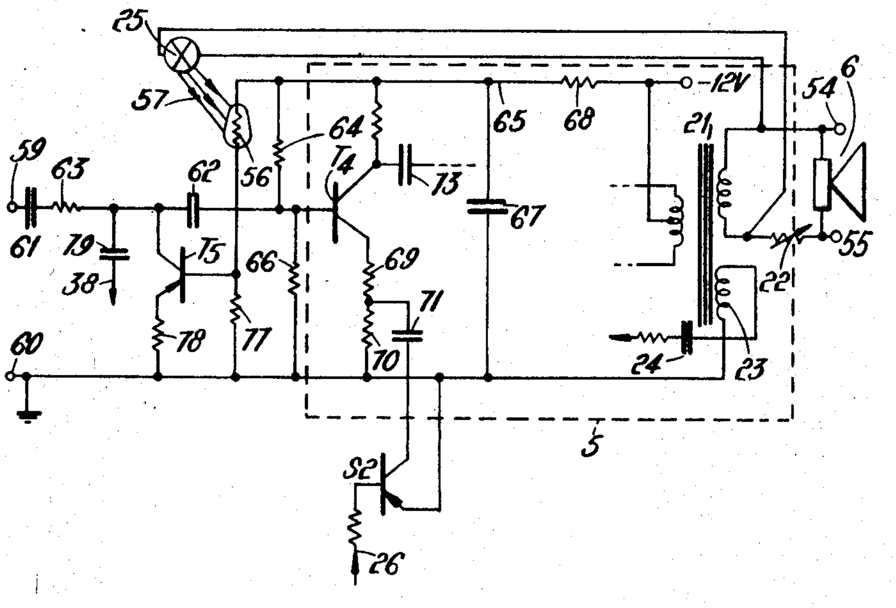
FIG. 3 is a circuit diagram of the automatic gain control arrangements.

In FIG. 3, within the dotted line 5 representing the loudspeaker channel amplifier, there are shown an input stage and the output transformer 21. The loudspeaker 6 is shown as in FIG. 1 connected across the secondary winding of transformer 21, while the A.G.C. circuit 7 is drawn on the left of FIG. 3. Terminals 59 and 60 represent the connections to the hybrid circuit 1 of FIG. 1. The first stage of the loudspeaker channel amplifier 5 is provided by a transistor T4 whose base is fed with signals from terminal 59 through D.C. blocking capacitors 61 and 62 and resistor 63 in series between the two capacitors. The base of transistor T4 is connected through resistor 64 to a negative supply line 65 and through resistor 66 to terminal 60 which is earthed. Negative supply line 65 is grounded for A.C. purposes through capacitor 67 and is fed from a terminal marked −12 v. through resistor 68.

The emitter electrode of T4 is connected to earth through resistors 69 and 70, the latter being normally bypassed by capacitor 71 which is connected to earth via the collector-emitter circuit of switching transistor S2 whose base potential is controlled by the potential of lead 26 from control circuit 8 (FIG. 1). As just implied, the base potential of S2 is normally such that capacitor 61 is taken through a low impedance path to earth. When the potential of lead 26 is changed to open the switching transistor S2, capacitor 71 is virtually disconnected and hence considerable negative feedback is applied to the input of the amplifier by resistor 60 and the amplifier gain is correspondingly reduced. The collector of the first stage transistor T4 is fed from the negative supply line 65 through resistor 62 and is coupled through capacitor 73 to the succeeding amplifier stages which are not shown in FIG. 3.

At the output end of the loudspeaker channel amplifier 5, the output stage feeds into the primary winding of transformer 21 whose center tap is connected to the −12 v. supply. As previously explained, the secondary winding of transformer 21 feeds loudspeaker 6 with manual volume control 22 in series therewith and a tertiary winding 23 provides negative feedback through network 24 for the stages L2 of amplifier 5. Terminals 54 and 55, directly across the loudspeaker, are for connection of the control path 36 feeding the echo muting detector 11 in FIG. 1. The A.G.C. lamp 25 is connected across the secondary transformer 21 and is arranged to illuminate a photosensitive resistor 56, as represented by the arrowed broken lines 57. The photosensitive resistor 56 is connected in series with fixed resistor 77 between the negative supply lead 65 and earth. The junction between photosensitive resistor 56 and fixed resistor 77 is connected to the base of transistor T5 whose emitter electrode is connected to earth through resistor 78 and whose collector electrode is taken to the junction between resistor 63 and capacitor 62. The input lead 38 of FIG. 1 feeding the loudspeaker channel switching amplifier 10 is also connected to the junction of resistor 63 and capacitor 62 through D.C. blocking capacitor 79.

The operation of the A.G.C. circuit is as follows. The dark resistance of photosensitive resistor 56 is high so that, when it is not illuminated, very little current flows through it and the base of transistor T5 is substantially at earth potential. The emitter-collector circuit of transistor T5 therefore presents a high impedance, compared with resistor 63 so that the ratio of resistor 63 to the impedance of T5 does not cause appreciable reduction in signal level from terminals 59 and 60 to the base of T4. The resistor 78 is small compared to the turned off collector-emitter impedance of T5. When photosensitive resistor 56 is illuminated, its resistance falls, permitting more current to flow through resistor 77, so that transistor T5 is no longer cut off. The emitter-collector circuit of T5 is therefore decreased in resistance and divides the signal down as it is now small compared with resistor 63. Resistor 78 sets the maximum amount of division which can occur, thereby setting the level at which the A.G.C. operates. The effective sensitivity of both these amplifiers is therefore reduced the higher the illumination provided from lamp 25.

Lamp 25 is preferably a filament lamp and its thermal inertia evens out short time fluctuations of power supplied to the loudspeaker. The combination of lamp and photosensitive resistor for A.G.C. control provides inherent smoothing and so eliminates the complications of control voltage smoothing necessary with rectified voltage A.G.C. systems. When photosensitive resistor 56 is permitted to attain its dark resistance, and is then suddenly illuminated, there is a considerable time lag before its resistance drops to the value appropriate to the amount of light flux falling upon it. To this must be added the shorter time which must elapse before the lamp 25 lights up fully. In consequence there will be a degree of "A.G.C. bursting" when signals appear between terminals 59 and 60 after a long interval of quiescence. This means that the switching amplifier 10 is initially fed with a higher level of signals than will obtain when the A.G.C. circuit is fully operative. This has the advantage of allowing fast switching operate times and reduction of clipping in speech from the distant line talker. The effect of A.G.C. bursting at the loudspeaker is offset in part by the loading of the cold resistance of lamp 25 and, in greater measure, by the initial low input impedance of the echo muting detector 11.

In a practical embodiment of the invention the input impedances of amplifiers 5 and 10 were approximately 2,000 ohms respectively. Resistor 63 was 2.7K ohms. Photoresistor 56 was a commercial cadmium sulphide element having a dark resistance of 3.9K ohms. When the lamp 25 was fed with voltage between 0.6 volt and 2.0 volts, the corresponding resistance of the photosensitive element varied between 400K ohms and 2.1K ohms. During normal operation the lamp filament had about one volt across it, the corresponding resistance of element 56 then being 60K ohms. The attenuation between the hybrid circuit and the actual inputs to the amplifiers 5 and 10 thus tended to remain constant for input signals on the line 2 of varying over a range of approximately 10 db, the A.G.C. network 7 varying its attenuation to maintain the inputs approximately constant.

If the input to switching amplifier 10 had been taken directly from the output of the hybrid circuit, the level of speech required at the local microphone in order to enable the local talker to intervene would have varied in accordance with the level of the incoming signals, whereas, with the present arrangement, the level at which the local talker must speak in order to interrupt a distant talker is approximately constant whether the distant talker is speaking loudly or softly. This arrangement also permits A.G.C. bursting to assist in rapid switching while allowing A.G.C. burst prevention to be applied to the loudspeaker amplifier.

Figure 4:
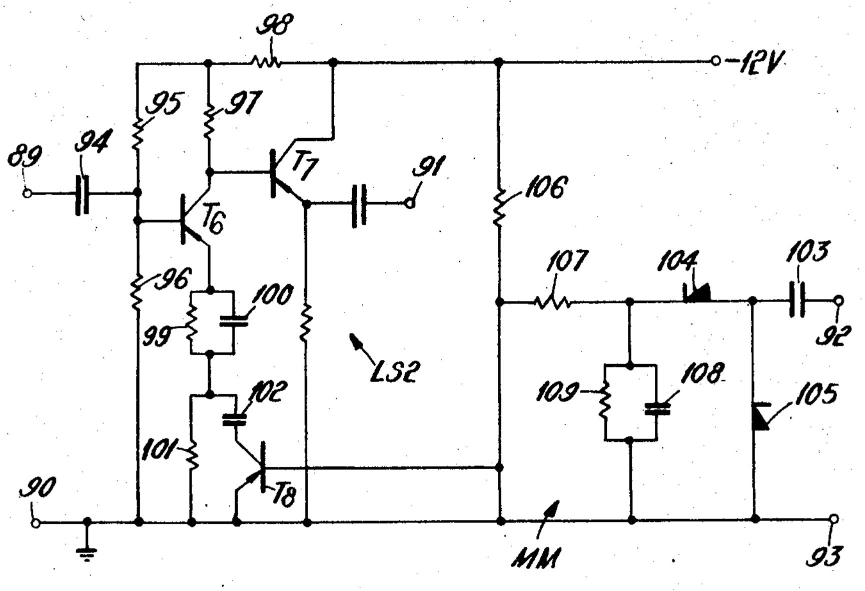
FIG. 4 is a circuit diagram showing a more precise arrangement of the interconnection between the hybrid circuit on the microphone input side and the loudspeaker channel switching amplifier.

Referring now to FIG. 4, terminals 89 and 90 indicate input connections to the amplifier stages LS2 in switching amplifier 10 of FIG. 1, terminal 89 representing the connection from the output of stages LS1 and terminal 90 being connected to earth. Terminal 91 represents the connection to the loudspeaker channel speech detector 31 in FIG. 1. Terminals 92 and 93 represent the connections from winding 15 of the microphone channel output transformer 14 in FIG. 1 and the circuitry in between the above numbered terminals comprises that of the detector circuit 12 of FIG. 1 and the amplifier stages LS2 of loudspeaker channel switching amplifier 10 in FIG. 1. The first stage of amplifier LS2 has a transistor T6 having its base connected through D.C. blocking capacitor 94 to terminal 89 and connected directly to the junction between resistors 95 and 96 which are joined in series betweeen a negative D.C. supply line and earth. The collector electrode is supplied through resistor 97 from the same negative D.C. supply line, which is fed through resistor 98 from a terminal labelled −12 v. The collector of transistor T6 is directly coupled to the base of output transistor T7. The emitter electrode of T6 is connected to earth through biasing resistor 99, which is bypassed for high speech frequencies by capacitor 100, and then through resistor 101. Resistor 101 is of a high value such as to provide a large amount of negative feedback to T6, but may be by-passed by capacitor 102, which has an eath connection taken through the collector and emitter electrodes of switching transistor T8. The base potential of transistor T8 is determined by the network MM. In this network, speech signals fed in at terminal 92 are taken through capacitor 103 to the junction of half-wave rectifiers 104 and 105 which are arranged in a series chain consisting of resistor 106, resistor 107, rectifier 104 and rectifier 105 the −12 v. terminal and earth, the rectifiers being so poled that current may flow in the conventional direction from earth through the two rectifiers and the two resistors 106 and 107 to the negative supply terminal. A capacitor 108 is arranged for charging by rectified speech signals, one terminal of the capacitor being connected to the junction between resistor 107 and rectifier 104 and the other capacitor terminal being connected to earth. A resistor 109 shunted across capacitor 58 provides for discharge of the capacitor. The junction between resistors 107 and 107 is connected to the base of transistor T8.

In the absence of speech signals between terminals 92 and 93 the junction of resistor 107 and rectifier 104 is substantially at earth potential, current flowing through resistor 107 with very little voltage drop across the rectifiers 104, 105, while the base of transistor T8 is held at a negative potential. Under these conditions the collector-emitter circuit of T8 behaves as a low valued resistor in series with capacitor 102 and substantially shunts the feedback resistor 101. Hence transistor T6 operates at full gain and speech signals in the loud-speaker channel are amplified by the stages LS1 and LS2 of the loudspeaker channel switching amplifier 10 and are fed out from terminal 91 to energize the loudspeaker speech detector 31 of FIG. 1. When speech signals from the microphone channel appear across terminals 92 and 93, positive half-cycles charge up capacitor 108 and so reduce the emitter-base potential or transistor T8, so increasing the resistance of the collector-emitter circuit. The impedance in series with capacitor 102 now becomes large and the shunt across feedback resistor 101 is substantially removed. Hence the gain of T6 and of the amplifier section LS2 is reduced to a low value. Microphone signals fed into the microphone channel switching amplifier MS, even though they are still attenuated by the transistor switch S1 being closed, are sufficient to switch over the control circuit 8 and so allow the local subscriber to seize the circuit or, if he already has command of the circuit and is speaking at a level at which hybrid breathrough could occur, the effect of this breakthrough on the switching is reduced by the reduction in gain of the switching amplifier 10.

Figure 5:
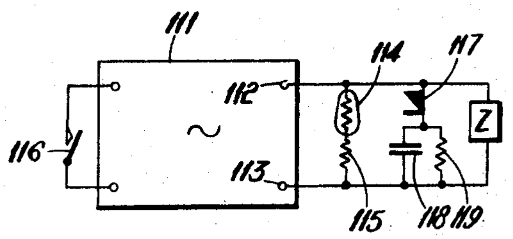
FIG. 5 is a schematic diagram of a thermistor-controlled oscillator utilizing the invention.

In the embodiment of FIG. 5 an oscillator, the internal details of which are of no concern to this invention, is indicated by the block 111 and has a pair of output terminals 112, 113 which are connected to a load denoted by the block Z. The combination of a directly heated negative temperature coefficient thermistor 114 in series with a fixed resistor 11*t* is shunted across the terminal 112, 113 and is arranged to maintain the voltage across the combination substantially constant for a wide range of currents passing through the thermistor. A switch 116 is arranged, by means not shown, to interrupt the oscillator circuit and enable the oscillator to be switched on or off rapidly when required. By way of example, the oscillator 111 could be the erase signal generator of a tape recorder furnishing a 50 kc./s. output to an erase head constituting the load Z. Shunted across the output terminals of the oscillator, in addition to the load Z and the thermistor level controlling arrangement, is the combination of a half-wave rectifier 117 in series with the parallel arrangement of a capacitor 118 and a resistor 119.

In the absence of the rectifier capacitor combination 117, 118 and 119 when the oscillator 111 is switched on after having been off for a considerable time interval, oscillations will build up to a level higher than will obtain when the thermistor 114 attains its steady operating temperature. As the thermistor temperature rises, its resistance will fall until the current passing through the combination of a thermistor 114 and resistor 115 is within the constant voltage range of the gain-controlling combinations. A graph of mean output level plotted against time, *t*, will be similar to the curve OP1 shown in FIG. 7 and exhibits a pronounced initial peak or A.G.C. burst B.

Figure 7:
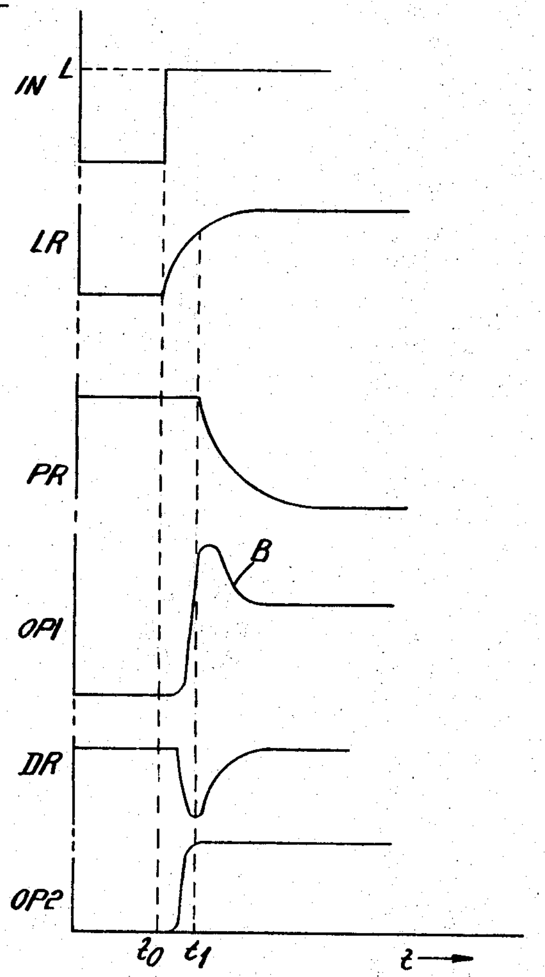
FIG. 7 is a set of response curves illustrating the performance of the embodiment of FIG. 4.

With the inclusion, according to the invention, of the rectifier-capacitor combination 117, 118, 119 the output of the oscillator will be damped for a time and to an extent dependent upon the values of the components 118 and 119. The curve DR in FIG. 7 illustrates the variation with the time of this damping load when the capacitor 118 is initially uncharged and the level across the terminals 112 and 113 rises as in curve OP1. The effect of this damping is to decrease the effective output level during the transient period so that a response curve similar to OP2 in FIG. 3 is obtained, the values of the components 118 and 119 being chosen to eliminate the peak B of curve OP1.

Figure 6:
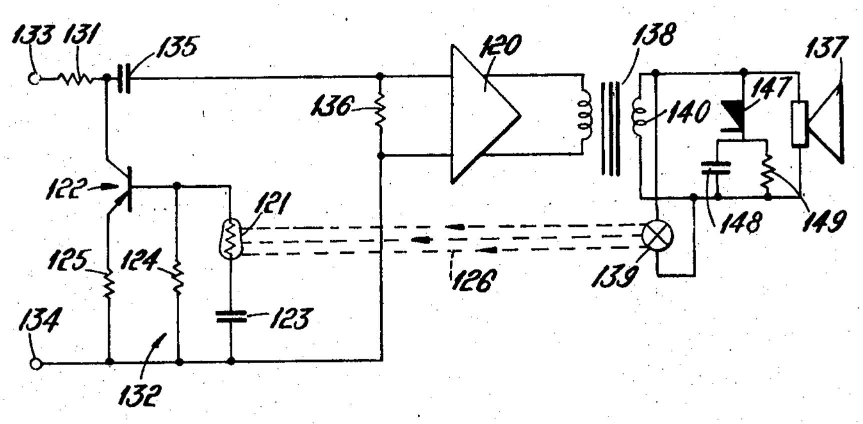
FIG. 6 illustrates the application of the invention to an audio frequency amplifier having lamp-photoresistor gain control.

In the embodiment of FIG. 6 an amplifier 120 is fed, via a potential divider arrangement consisting of a resistor 131 and an A.G.C. attenuation circuit 132 from signals across input terminals 133 and 134. The input to the amplifier is taken from across the circuit 132 and fed through a D.C. blocking capacitor 135 to appear across an input load resistor 136. The A.G.C. circuit 132, forming the lower arm of the input potential divider, will be described below. The amplifier feeds a loudspeaker 137 through a transformer 138. A low power lamp 139 is shunted across the secondary winding 140 of transformer 138. A rectifier-capacitor combination 147, 148, 149 similar to that of FIG. 5, is also shunted across the secondary winding. The A.G.C. circuit 132 consists of a photosensitive resistor 121 connected between the base of a transistor 122 and the negative terminal of a source 123 of current for the transistor 122, the positive terminal of the source being connected to terminal 134. The base of transistor 122 is also connected to terminal 134 through resistor 124. The emitter electrode of the transistor is similarly connected to terminal 134 through resistor 125. The transistor collector electrode is connected to the junction of resistor 131 and capacitor 135.

When the amplifier 120 is delivering power to the loudspeaker 137, a portion of the amplifier output is fed to and illuminates lamp 139, light from which is arranged to fall on the photoresistor 121, as indicated by the arrowed dotted lines 126. With increase of light flux illuminating photoresistor 121, its resistance decreases, thereby allowing the current in the emitter-base circuit of transistor 122 to increase and the impedance of the collector-emitter circuit to decrease. Thus the attenuation in the input to amplifier 120 increases with increase of power fed to the loudspeaker 137. This type of automatic gain control has several advantages over earlier A.G.C. systems relying on rectification and smoothing of the signals applied to the A.G.C. system for the provision of a smoothed D.C. control voltage. The lamp and photoresistor combination themselves provide a requisite amount of smoothing while, as the lamp is a power-operated device, it responds to the mean power in the output circuit of the amplifier. Suitable filament lamp photoresistor combinations are commercially available for a variety of control functions.

The use of a filament lamp for A.G.C. purposes in itself provides a small degree of A.G.C. burst prevention since, when cold, its resistance will be low and it will damp the output circuit of the amplifier. During this "warm up" time there is a delay in light output. Also, the photoresistor 121 will normally require a much longer time than the lamp to reach its effective working condition. The operation of the arrangement of FIG. 3 will now be described in terms of an input which can be represented in terms of a step function shown in the graph labelled IN in FIG. 7.

Consider first of all the operation of the circuit of FIG. 6 in the absence of the rectifier-capacitor combination 147, 148, 149 shunting the amplifier output. Let us assume that the mean input at terminals 133, 134 rises from zero level to level L at time $t_0$ and thereafter remains constant. Prior to $t_0$ the photoresistor 121 will be unilluminated and hence the A.G.C. circuit 132 will apply little attenuation to the input of amplifier 120. The input signals are therefore subject to the full gain of the amplifier. Because of the thermal inertia of the lamp 139 time is required, even under full excitation, for the output from the lamp to reach its intensity appropriate to the power supplied to the lamp. This is represented in the curve LR in FIG. 7 which is a plot of lamp resistance as a function of time for a constant voltage applied to the filament. The lamp will not emit any appreciable light until its resistance has increased appreciably, say at time $t_1$. Thus the photoresistor 121 is virtually in darkness until time $t_1$ and it is only at this time that its resistance commences to decrease. The resistance of photoresistor 121 as a function of time is shown in curve PR in FIG. 3. Considering now the output of the amplifier, at time $t_0$ the resistance of lamp 139 is low and the lamp therefore damps the output, so the output level across the loudspeaker terminals rises only slowly for the first part of the time interval $t_0$ to $t_1$. As the lamp resistance increases, the damping on the output circuit decreases and the level rises sharply to a maximum at the time $t_1$, when the photoresistor 121 starts to be operative. After time $t_1$ the light flux from lamp 139 increases somewhat and the resistance of photoresistor 121 decreases rapidly to a level appropriate to the final output from the lamp 139. The level of the signals applied to the loudspeaker therefore follows a curve such as shown at OP1 in FIG. 7 and exhibits the A.G.C. burst B previously referred to in connection with the embodiment of FIG. 5. If now the rectifier capacitor combination 147, 148, 149 is inserted in shunt across the amplifier output in accordance with the invention, and the components of the combination are suitably chosen, additional damping is applied across the amplifier load, commencing from a time in between $t_0$ and $t_1$ at which the output level of the amplifier first commences to rise. The damping increases to a maximum at time $t_1$ when the A.G.C. circuit starts to take effect, and thereafter decreases slowly in accordance with the time constant of the damping combination and the change level across the output of amplifier 120. This is depicted in curve DR in FIG. 7. The effect of all the factors discussed above on the resultant output level of the amplifier can be represented approximately as a summation of the curves OP1 and DR of FIG. 7, as shown in the curve OP2. The output rises very little if at all during the time of the initial rise of curve OP1 and, thereafter, increases rapidly to the final level of curve OP1 without exhibiting the peak B. The A.G.C. bursting is thus eliminated.

In a typical practical arrangement full output from lamp 139 demanded a filament power of 0.2 watt and, on excitation from cold, attained from 70% of its rated output within a time of 5 milliseconds, while the resistance of the lamp filament varied from a cold resistance of 7 ohms to a resistance of 32 ohms when fully excited. The photoresistor was a cadmium sulphide element mounted in a housing provided with a window for illumination of the element. With the lamp placed right up against the window of the photoresistor housing, so as to subtend the greatest solid angle at the photoresistor surface, the relationship between the resistance of the photoresistor and the R.M.S. voltage applied to the lamp is exhibited in FIG. 7, from which it is seen that the resistance changes by a factor of the order of 1,000 for change of lamp voltage from about 0.6 v. to 4.0 v. R.M.S.

The loudspeaker impedance was 20 ohms and satisfactory values for the components 8 and 9 were found to be as follows: Capacitor 8 500 $\mu$f.; Resistor 9 600 ohms. Whereas without the rectifier-capacitor combination of the present invention A.G.C. bursts of up to 10 db above the design output level were obtained, with the inclusion of the rectifier-capacitor combination the bursting under similar conditions was reduced to 2 db.

Figure 8:
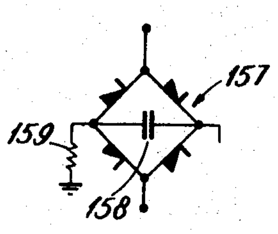
FIG. 8 illustrates a modification of the arrangement of FIG. 6.
Figure 9:
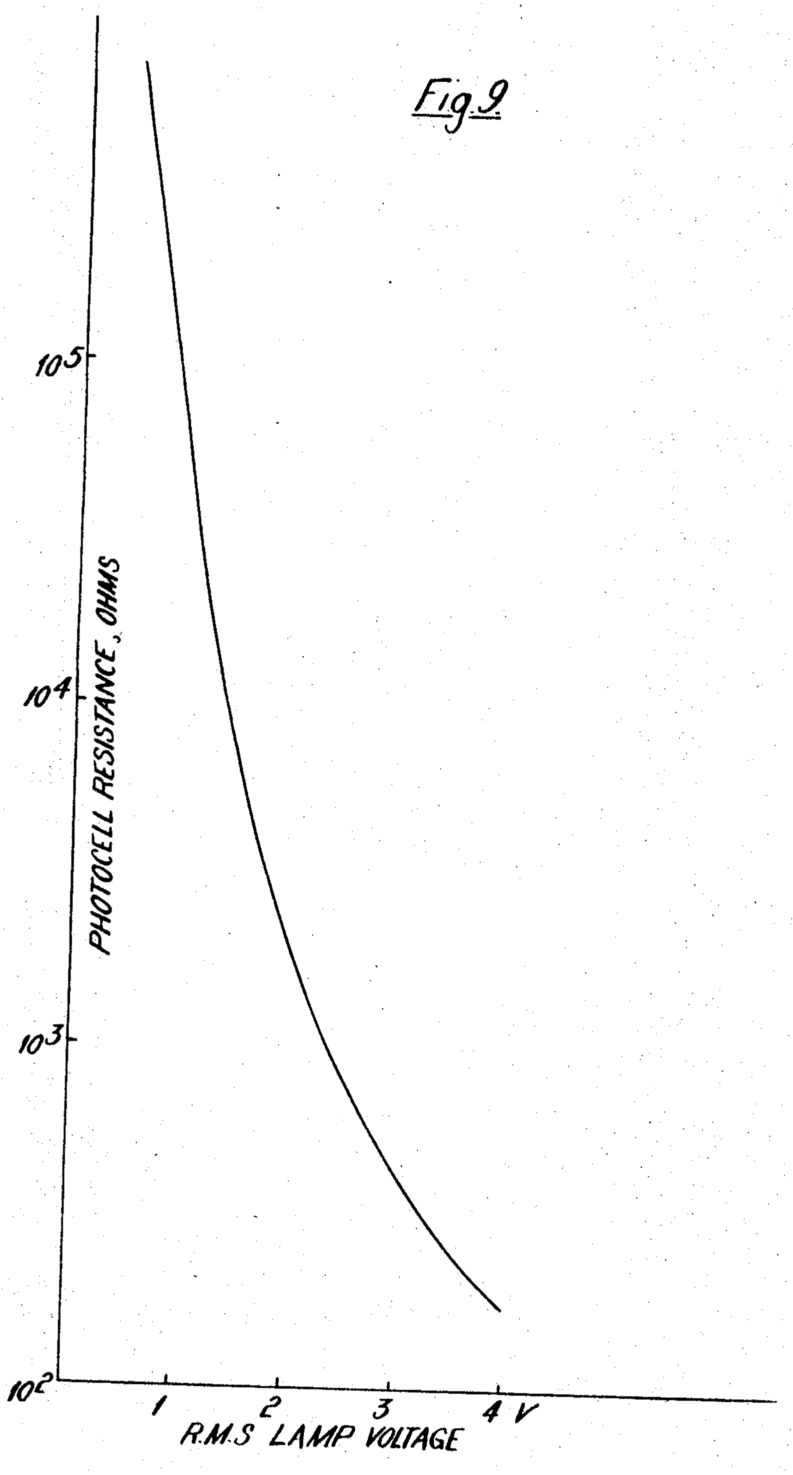
FIG. 9 illustrates the variation of resistance of a photoresistor with applied lamp voltage in the arrangement of FIG. 6.

Although in FIGS. 5 and 6 a rectifier-capacitor combination including a half-wave rectifier is shown, other combinations may be employed, in particular a bridge rectifier arrangement such as shown in FIG. 8. Here a bridge rectifier 157 is arranged to charge a capacitor 158 connected across the D.C. diagonal of the bridge, the capacitor discharging through a resistor 159. Further, if desired, a D.C. signal, proportional to the amplifier output, for control of other apparatus is available from across the capacitor in either of the arrangements illustrated.

I claim:

1. A loudspeaker telephone circuit arrangement comprising:
- hybrid circuit means coupled to a telephone line;
- microphone transmission channel means coupled to an input of said hybrid circuit;
- loudspeaker reception channel means coupled to an output of said hybrid circuit;
- control circuit means coupled to said microphone channel means and said loudspeaker channel means for controlling the transmission to and reception from said telephone line respectively;
- a microphone switching amplifier coupled between said microphone channel and said control circuit for causing said control circuit to provide a first output control signal;
- a loudspeaker switching amplifier coupled between said loudspeaker channel and said control circuit for causing said control circuit to provide a second output control signal;
- echo muting means coupled between said loudspeaker channel and said microphone switching amplifier to reduce the gain of said microphone switching amplifier in response to a signal appearing in said loudspeaker channel;
- a breakthrough muting circuit coupled to said loudspeaker switching amplifier; and
- means in said hybrid circuit for coupling a signal from said microphone channel to said breakthrough muting circuit,
- said breakthrough muting circuit reducing the gain of said loudspeaker switching amplifier when said microphone channel signal exceeds a predetermined level.

2. A loudspeaker telephone circuit arrangement, according to claim 1, wherein said transmission microphone channel means comprises:
- a microphone for the reception of input information signals; and
- at least one microphone signal amplifier coupled between said microphone and said hybrid circuit,
  - said control circuit being coupled to said signal amplifier to control the transmission of information signals from said microphone to said hybrid circuit.

3. A loudspeaker telephone circuit arrangement, according to claim 1, wherein said loudspeaker reception channel means comprises:
- at least one loudspeaker signal amplifier providing an output signal;
- an A.G.C. circuit coupled to said hybrid circuit for receiving signals from said telephone line, an output of said A.G.C. circuit being coupled to said loudspeaker signal amplifier and to an input of said loudspeaker switching amplifier;
- an electro-mechanical transducer coupled to the output of said loudspeaker signal amplifier; and
- feedback means coupled between the output of said loudspeaker signal amplifier and said A.G.C. circuit to stabilize the output thereof,
  - said control circuit being coupled to said loudspeaker signal amplifier to control the amplitude of the output signal provided to said electro-mechanical transducer.

4. A loudspeaker telephone circuit arrangement, according to claim 3, wherein said A.G.C. circuit includes a photosensitive resistor; and
- said feedback means comprises a source of illumination, the intensity of said source being controlled by the amplitude of said loudspeaker signal amplifier output signal.

5. A loudspeaker telephone circuit arrangement, according to claim 1, wherein said echo muting means comprises a time constant circuit having a fast-charge slow-discharge characteristic, said echo muting means continuing to reduce the gain of said microphone switching amplifier after said signal appearing in said loudspeaker channel is terminated, said gain reduction continuing for a time dependent on the magnitude of said loudspeaker channel signal which caused said gain reduction.

6. A loudspeaker telephone circuit, according to claim 1, wherein said control circuit comprises:

a bi-stable switch, one output of which is coupled to said loudspeaker reception channel means and to said loudspeaker switching amplifier, the other output of which is coupled to said microphone transmission channel means;

first means coupling said microphone switching amplifier to said bi-stable switch providing for the driving of said switch toward one state;

second means coupling said loudspeaker switching amplifier to said bi-stable switch providing for the driving of said switch toward the second state; and third means coupling said bi-stable switch to said microphone switching amplifier providing for the driving of said switch toward said second state.

References Cited

UNITED STATES PATENTS

| | | | |
|---|---|---|---|
| 3,146,313 | 8/1964 | Ulin | 179—81(B) |
| 3,162,728 | 12/1964 | Pfister | 179—170(.8)X |
| 3,395,255 | 7/1968 | Clement | 179—81(B) |
| 3,461,240 | 8/1969 | Lindgren | 179—81(B)X |

FOREIGN PATENTS

| | | | |
|---|---|---|---|
| 845,409 | 4/1956 | Great Britain | 179—IVC |

KATHLEEN CLAFFY, Primary Examiner

W. A. HELVESTINE, Assistant Examiner

U.S. Cl. X.R.

179—81